US012800331B2

(12) United States Patent
Sugawara et al.

(10) Patent No.: US 12,800,331 B2
(45) Date of Patent: Nov. 17, 2026

(54) VEHICLE DRIVE ASSIST APPARATUS

(71) Applicant: SUBARU CORPORATION, Tokyo (JP)

(72) Inventors: Hideki Sugawara, Tokyo (JP); Takahiro Furuya, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 259 days.

(21) Appl. No.: 18/124,286

(22) Filed: Mar. 21, 2023

(65) Prior Publication Data

US 2023/0314158 A1 Oct. 5, 2023

(30) Foreign Application Priority Data

Mar. 31, 2022 (JP) ................................ 2022-059610

(51) Int. Cl.
*G01C 21/36* (2006.01)
*B60Q 1/34* (2006.01)
*G01C 21/34* (2006.01)

(52) U.S. Cl.
CPC .......... *G01C 21/365* (2013.01); *B60Q 1/346* (2013.01); *G01C 21/3492* (2013.01)

(58) Field of Classification Search
None
See application file for complete search history.

(56) References Cited

U.S. PATENT DOCUMENTS 8,260,536 B2 * 9/2012 Stefani .................... B60Q 1/50 701/418
11,926,344 B1 * 3/2024 Roy ........................ G08G 1/04
2012/0271510 A1 * 10/2012 Seymour ................. B60Q 1/46 701/36
2018/0157037 A1 * 6/2018 Kasazumi .............. B60K 35/28
2019/0147272 A1 * 5/2019 Yokota ................... G06V 40/18 340/576
2020/0307579 A1 10/2020 Mizoguchi
(Continued)

FOREIGN PATENT DOCUMENTS

JP 2020-166393 A 10/2020

*Primary Examiner* — Christian Chace
(74) *Attorney, Agent, or Firm* — TROUTMAN PEPPER LOCKE LLP

(57) ABSTRACT

A vehicle drive assist apparatus includes: a traveling environment information acquirer that acquires information on an area around a vehicle; an orientation detector that detects a face orientation or a line of sight of a driver; a projector that projects a course image indicating a vehicle's turning direction onto a road surface ahead of the vehicle; and a controller that sets the course image and controls the projector. The controller detects a driver's turn signal operation. Upon detecting the turn signal operation, the controller estimates a vehicle's turn position based on the face orientation or a direction of the line of sight. Upon determining, based on the information, that the turn position is not the intersection, the controller calculates a distance from the vehicle to the turn position based on the information, and set the course image indicating the turn position of the vehicle based on the distance.

18 Claims, 13 Drawing Sheets

(56) References Cited

U.S. PATENT DOCUMENTS

| | | | | |
|---|---|---|---|---|
| 2020/0380257 | A1* | 12/2020 | He | G06V 20/64 |
| 2021/0183072 | A1* | 6/2021 | Puri | G06T 7/70 |
| 2022/0194370 | A1* | 6/2022 | Yoshikawa | B60W 40/04 |
| 2022/0244066 | A1* | 8/2022 | Kunii | B60Q 1/085 |
| 2024/0085209 | A1* | 3/2024 | Misumi | G08G 1/16 |

* cited by examiner

VEHICLE DRIVE ASSIST APPARATUS

CROSS-REFERENCE TO RELATED APPLICATION

The present application claims priority from Japanese Patent Application No. 2022-059610 filed on Mar. 31, 2022, the entire contents of which are hereby incorporated by reference.

BACKGROUND

The disclosure relates to a vehicle drive assist apparatus that explicitly notifies surrounding moving targets about the course of a vehicle when a driver who drives the vehicle causes the vehicle to enter a parking lot of a shop or the like.

When a driver causes his/her vehicle to make a turn (to the right or left), the driver blinks, in accordance with traffic laws and regulations, the turn signal at a preset distance (for example, 30 m) behind an intersection where the vehicle will make the turn. By blinking the turn signal, a succeeding vehicle, an oncoming vehicle, or a pedestrian recognizes the traveling direction of the vehicle.

The same applies to lane change by autonomous driving. For example, Japanese Unexamined Patent Application Publication No. 2020-166393 discloses a technology in which, when a vehicle changes lanes, a succeeding vehicle or any other surrounding vehicle is notified about the lane change by blinking in advance a turn signal lamp indicating the direction of the lane change.

SUMMARY

An aspect of the disclosure provides a vehicle drive assist apparatus to be applied to a vehicle. The vehicle drive assist apparatus includes a traveling environment information acquirer, an orientation detector, a projector, and a controller. The traveling environment information acquirer is configured to acquire traveling environment information on an area around the vehicle. The orientation detector is configured to detect a face orientation or a line of sight of a driver who drives the vehicle. The projector is configured to project a course image indicating a turning direction of the vehicle onto a road surface ahead of the vehicle. The controller is configured to set the course image to be projected by the projector and control drive of the projector. The controller includes a turn signal operation detector, a turn position estimator, an intersection determiner, and a course image setter. The turn signal operation detector is configured to detect a turn signal operation of the driver. The turn position estimator is configured to, when the turn signal operation detector detects the turn signal operation, estimate a turn position of the vehicle based on the detected face orientation or a direction of the detected line of sight of the driver. The intersection determiner is configured to make determination on an intersection based on the traveling environment information acquired by the traveling environment information acquirer. The course image setter is configured to, when the intersection determiner determines that the turn position estimated by the turn position estimator is not the intersection, calculate a distance from the vehicle to the turn position based on the traveling environment information acquired by the traveling environment information acquirer, and set the course image indicating the turn position of the vehicle based on the calculated distance.

An aspect of the disclosure provides a vehicle drive assist apparatus to be applied to a vehicle. The vehicle drive assist apparatus includes circuitry. The circuitry is configured to acquire traveling environment information on an area around the vehicle. The circuitry is configured to detect a face orientation or a line of sight of a driver who drives the vehicle. The circuitry is configured to cause a projector to project a course image indicating a turning direction of the vehicle onto a road surface ahead of the vehicle. The circuitry is configured to detect a turn signal operation of the driver. The circuitry is configured to, upon detecting the turn signal operation, estimate a turn position of the vehicle based on the detected face orientation or a direction of the detected line of sight of the driver. The circuitry is configured to make determination on an intersection based on the acquired traveling environment information. The circuitry is configured to, upon determining that the estimated turn position is not the intersection, calculate a distance from the vehicle to the turn position based on the acquired traveling environment information, and set the course image indicating the turn position of the vehicle based on the calculated distance.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
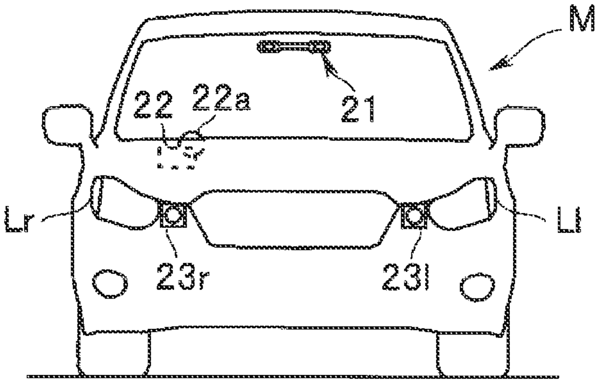
FIG. 1 is a front view of a vehicle.

The laws provide for a timing to start blinking a turn signal lamp for lane change of a vehicle and a timing to start blinking the turn signal lamp for a right or left turn at an intersection. When causing the vehicle to make a turn (to the right or left), the turn signal lamp is caused to start blinking, in accordance with the laws, at a predefined distance (for example, 30 m) behind an intersection where the vehicle will make the right or left turn.

When the driver blinks the turn signal to enter, for example, a parking lot of a shop or the like located behind an intersection, an oncoming vehicle, a succeeding vehicle, or a target moving along a sidewalk in front of the shop (pedestrian or bicycle) may have difficulty in determining whether the vehicle will enter the parking lot of the shop or turn at the intersection ahead.

For example, when the vehicle traveling along a left-hand traffic road turns right to enter a parking lot of a shop or the like located on an oncoming lane side, an oncoming vehicle driver may misjudge that the vehicle will turn right at an intersection that is located ahead of the shop when viewed from the vehicle. Therefore, the oncoming vehicle driver may pass through an area in front of the shop without decelerating the oncoming vehicle, thereby increasing a possibility that the oncoming vehicle comes into contact with the vehicle turning right.

It is desirable to provide a vehicle drive assist apparatus that can explicitly notify an oncoming vehicle and other surrounding moving targets about the traveling direction of a vehicle when the vehicle enters a parking lot of a shop or the like.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. For convenience, this embodiment is described under the assumption that the road is a left-hand traffic road. For a right-hand traffic road, this embodiment is applied by reversing right and left.

As illustrated in FIG. 1 to FIG. 4, a vehicle M has left turn signal lamps Ll at the front and rear on the left side, and right turn signal lamps Lr at the front and rear on the right side. A camera unit 21 is disposed at an upper central part in a vehicle width direction in a front area of a cabin of the vehicle M. A driver monitoring system (DMS) 22 is disposed in front of a driver's seat (for example, in an instrument panel). The configurations of the camera unit 21 and the DMS 22 are described later. In one embodiment, the camera unit 21 and a rear detection unit 26 described later may serve as a "traveling environment information acquirer". In one embodiment, the DMS 22 may serve as an "orientation detector".

A pair of right and left projector units 23*r* and 23*l* is disposed on both sides of the front of the vehicle M in the vehicle width direction (in the figures, inner sides of headlights in the vehicle width direction). In one embodiment, the projector units 23*r* and 23*l* may serve as a "projector".

A rear projector unit 24 is disposed at an upper central part in the vehicle width direction near a rear windshield in a rear area of the cabin of the vehicle M. In one embodiment, the rear projector unit 24 may serve as a "rear projector".

Each of the right and left projector units 23*r* and 23*l* and the rear projector unit 24 includes an optical system including a light source, a liquid crystal panel, and a projection lens. The light source and the liquid crystal panel are driven by a drive signal from each of right and left projector drivers 32*r* and 321 and a rear projector driver 33 described later.

Figure 2A:
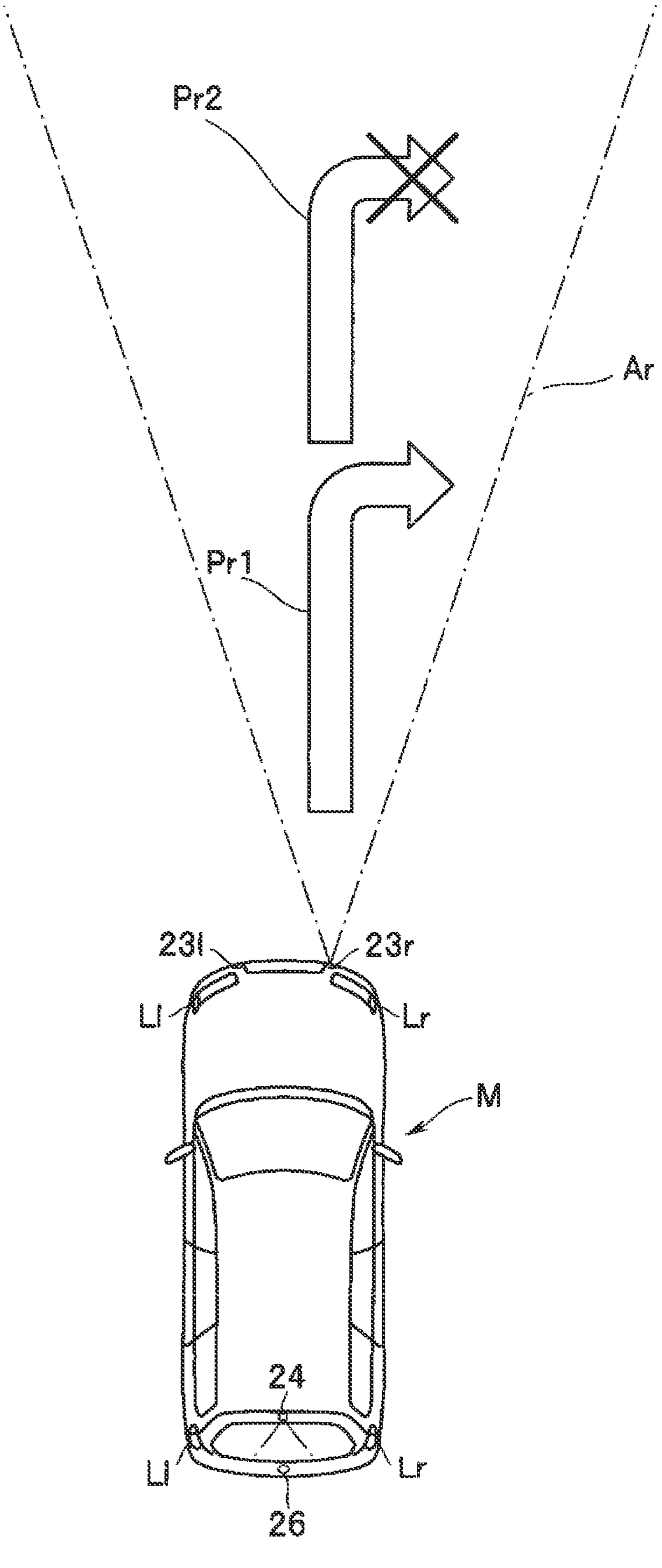
FIG. 2A is a plan view of the vehicle that will turn right.
Figure 2B:
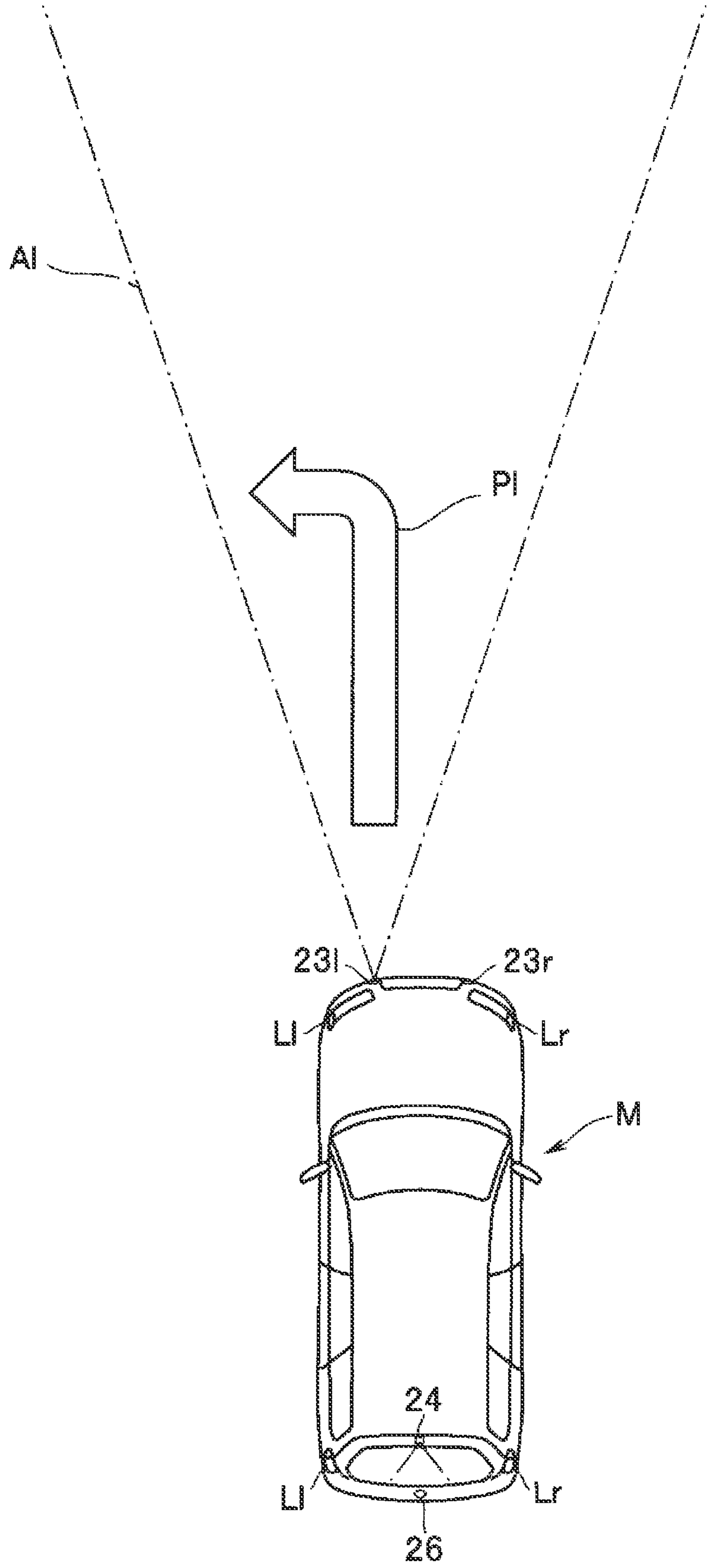
FIG. 2B is a plan view of the vehicle that will turn left.
Figure 3:
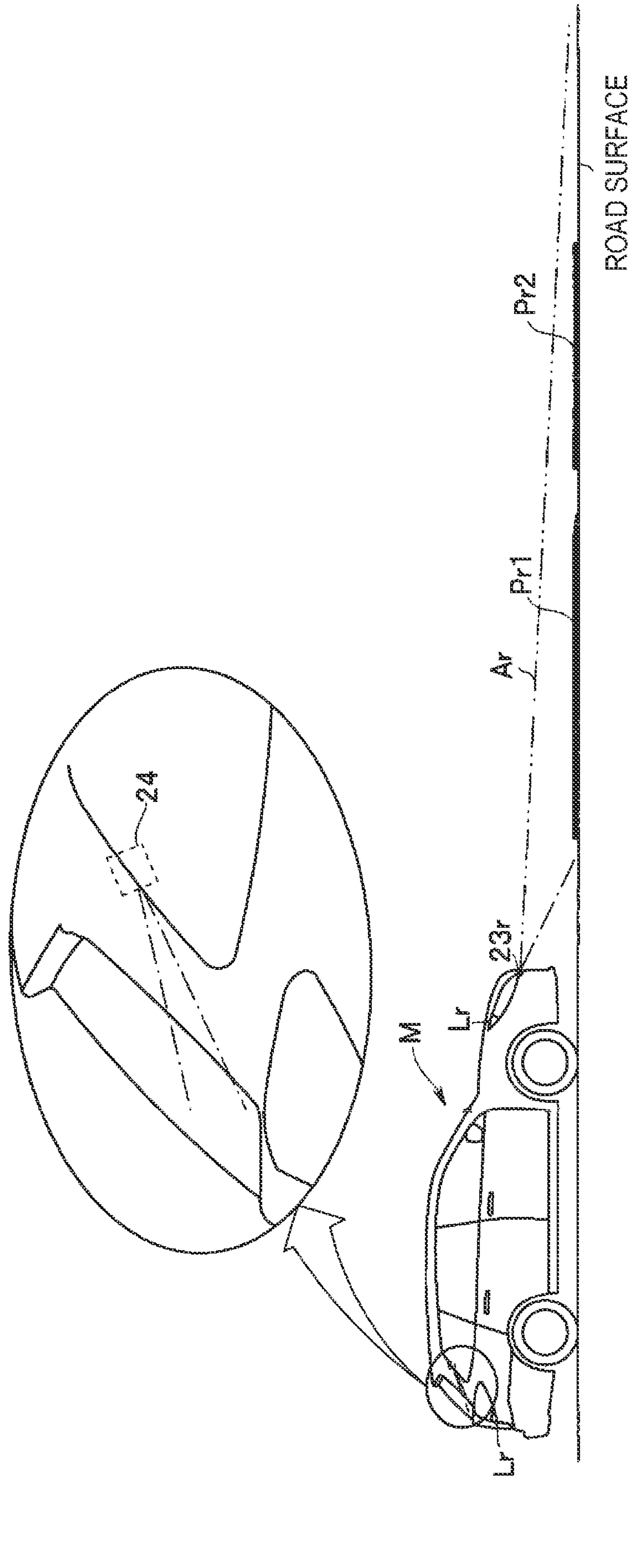
FIG. 3 is a right-hand side view of the vehicle.

Each of the right and left projector units 23*r* and 23*l* projects a course image indicating a turning direction onto a road surface ahead of the vehicle M when a driver of the vehicle M operates a turn signal switch 28 (see FIG. 6) to cause the vehicle M to make a turn (to the right or left). FIG. 2A and FIG. 3 illustrate a display example of the right projector unit 23*r*. FIG. 2B illustrates a display example of the left projector unit 23*l*.

The right projector unit 23*r* is activated by turning ON the turn signal switch 28 when the driver causes the vehicle M to turn right across an oncoming lane and a sidewalk to enter a parking lot of a shop or the like (hereinafter referred to as "shop parking lot" for convenience). As illustrated in FIG. 2A and FIG. 3, a near-side right turn course image Pr1 and a far-side no-right turn course image Pr2 are displayed in a right display area Ar ahead of the vehicle M depending on the surrounding situation. In one embodiment, the far-side no-right turn course image Pr2 may be referred to as a "no-turn image". Details of the display by the right projector unit 23*r* are described later.

The left projector unit 23*l* is activated by turning ON the turn signal switch 28 when the driver causes the vehicle M to turn left across a sidewalk to enter a shop parking lot. As illustrated in FIG. 2B, a near-side left turn course image Pl is displayed in a left display area Al ahead of the vehicle M. Details of the display by the left projector unit 23*l* are described later.

Figure 4:
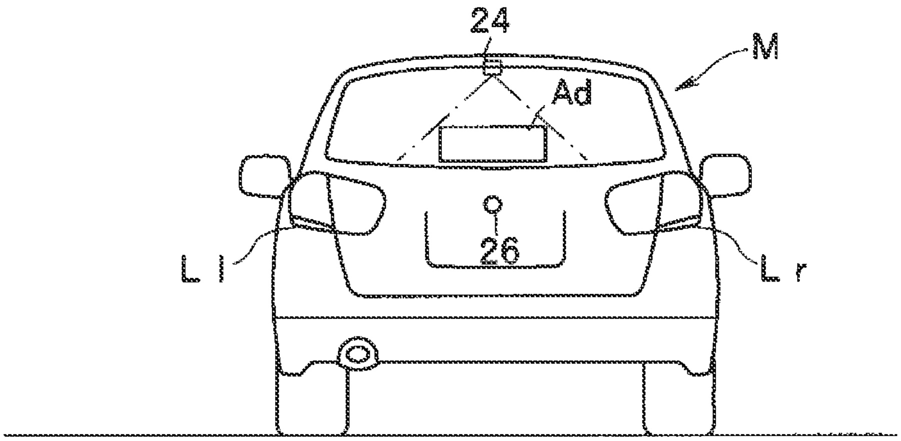
FIG. 4 is a rear view of the vehicle.
Figure 5A:
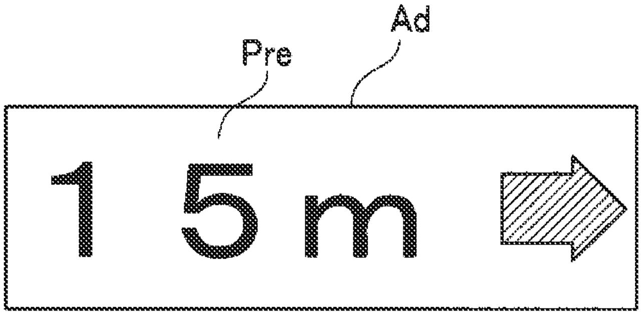
FIG. 5A is an explanatory view illustrating right turn information projected onto a rear windshield.
Figure 5B:
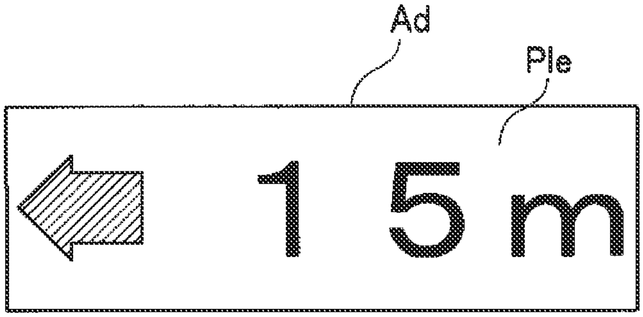
FIG. 5B is an explanatory view illustrating left turn information projected onto the rear windshield.

In a case where a succeeding vehicle S (see FIG. 10 and FIG. 11) is detected when the driver turns ON the turn signal switch 28 to cause the vehicle M to enter a shop parking lot, the rear projector unit 24 is activated and a course image showing a right turn arrow or a left turn arrow and a distance to the turning point is projected onto a rear display area Ad (see FIG. 4) set in the rear windshield of the vehicle M (see FIG. 5A and FIG. 5B). Details of the display by the rear projector unit 24 are described later.

Figure 6:
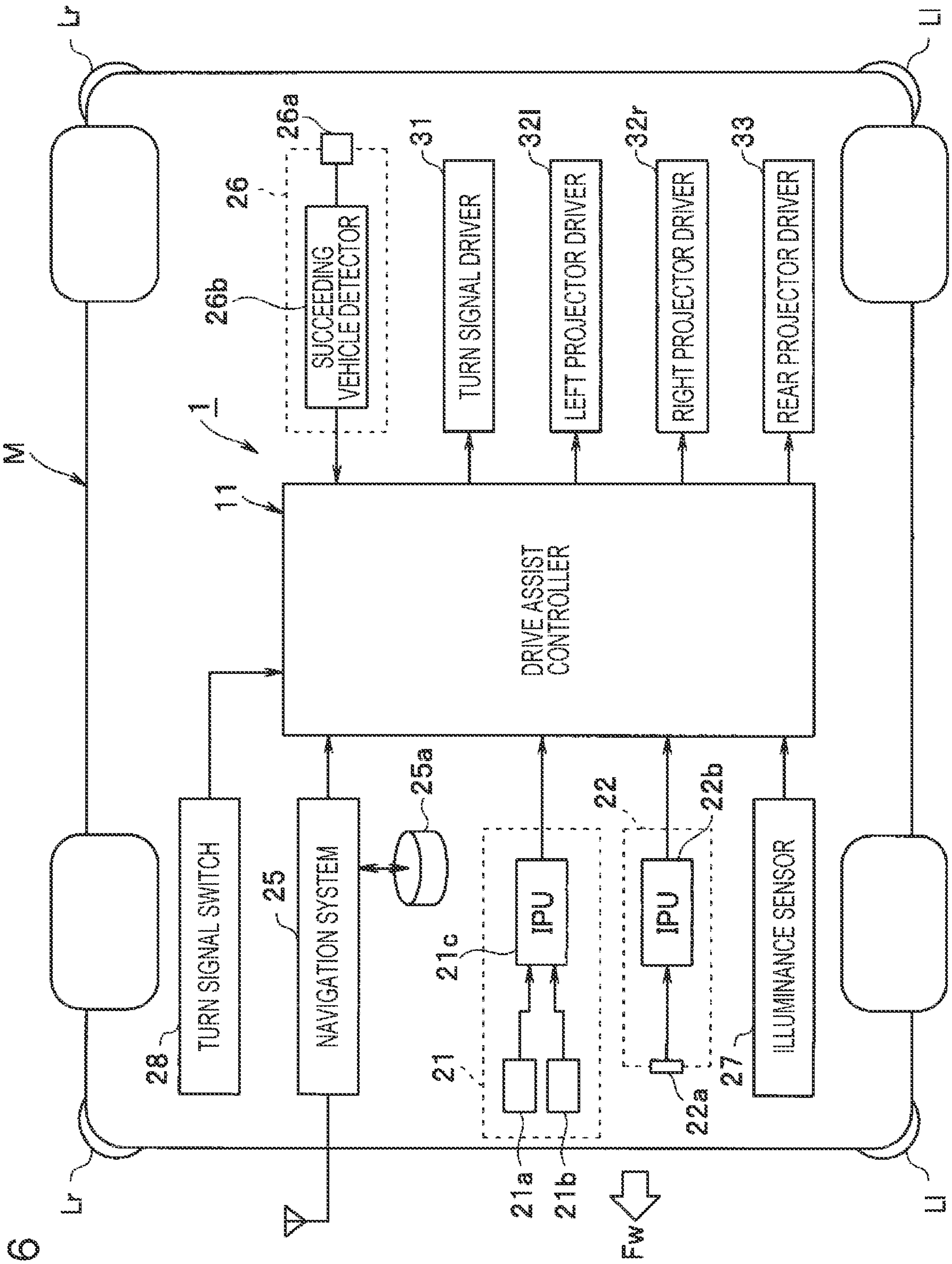
FIG. 6 is a schematic block diagram of a drive assist apparatus.

As illustrated in FIG. 6, the vehicle M includes a drive assist apparatus 1. The drive assist apparatus 1 includes a drive assist controller 11 that controls operations of the right and left projector units 23*r* and 23*l* and the rear projector unit 24. The drive assist controller 11 is a microcontroller including a CPU, a RAM, a ROM, a rewritable non-volatile memory (flash memory or EEPROM), and peripheral devices. The ROM stores programs and fixed data for use in execution of processes by the CPU. The RAM serves as a working area for the CPU to temporarily store various types of data being used by the CPU. The CPU is also referred to as "microprocessor (MPU)" or "processor". The CPU may be replaced by a graphics processing unit (GPU) or a graph streaming processor (GSP). Alternatively, the CPU, the GPU, and the GSP may be combined selectively.

Sensors and switches to be used for acquiring parameters for the control on the operations of the right and left projector units 23*r* and 23*l* and the rear projector unit 24 are coupled to an input side of the drive assist controller 11. The sensors and switches include, in addition to the camera unit 21 and the driver monitoring system (DMS) 22, a navigation system 25, the rear detection unit 26, an illuminance sensor 27 that detects an extraneous light intensity, and the turn signal switch 28 to be operated by the driver to turn the vehicle M.

The camera unit 21 includes a stereo camera including a main camera 21*a* and a subcamera 21*b* each having a CCD or a CMOS as an imaging element, and an image processing unit (IPU) 21*c*. In the camera unit 21, the IPU 21*c* performs predetermined image processing for traveling environment information on an area ahead of the vehicle M that is imaged by the cameras 21*a* and 22*b*, and the resultant information is transmitted to the drive assist controller 11.

The DMS 22 includes a driver recognition camera 22*a* (see FIG. 1) provided in front of the driver's seat (for example, the instrument panel), and an IPU 22*b* that processes an image captured by the driver recognition camera 22*a*. Based on a driver's facial image processed by the IPU 22*b*, the drive assist controller 11 checks a face orientation (or a line of sight) of the driver when the driver turns ON the turn signal switch 28.

The navigation system 25 includes a positioning radio wave receiver, and acquires positional information (latitudinal and longitudinal coordinates) based on a positional signal received by the positioning radio wave receiver from a positioning satellite such as a global navigation satellite system (GNSS). The navigation system 25 matches a traveling route to a destination set by the driver with road map information stored in a road map database 25*a*. The navigation system 25 matches a current position of the vehicle M with coordinates of the current position of the vehicle in the road map information.

The rear detection unit 26 includes a rear detection sensor 26*a* and a succeeding vehicle detector 26*b*. The rear detection sensor 26*a* senses a predetermined rear sensing area to acquire traveling environment information on an area behind the vehicle M. The rear detection sensor 26*a* includes one or more of a video camera, an ultrasonic sensor, a millimeter wave radar, a microwave radar, and a light detection and ranging (LiDAR) sensor. The video camera is not limited to a stereo camera but may be a monocular camera. Based on the rear environment information acquired by the rear detection sensor 26*a*, the succeeding vehicle detector 26*b* detects succeeding vehicle information such as information as to whether a succeeding vehicle S following the vehicle M is present and a distance and a relative speed between the vehicle M and the succeeding vehicle S.

A turn signal driver 31, the right projector driver 32*r*, the left projector driver 32*l*, and the rear projector driver 33 are coupled to an output side of the drive assist controller 11. The turn signal driver 31 blinks the front and rear right turn signal lamps Lr or the front and rear left turn signal lamps Ll in response to the driver's operation on the turn signal switch 28.

The right projector driver 32*r* or the left projector driver 321 drives the light source and the liquid crystal panel of the right projector unit 23*r* or the left projector unit 23*l* based on a signal from the drive assist controller 11. The light intensity of the light source is automatically adjusted depending on the extraneous light intensity detected by the illuminance sensor 27 so that an image projected onto a road surface can be recognized even in a sunny daytime.

The right or left projector driver 32*r* or 32*l* drives the projector unit 23*r* or 23*l* to project, onto a road surface, a course image displayed on the liquid crystal panel. In this embodiment, a right turn arrow image or a left turn arrow image in FIG. 2A or FIG. 2B is projected as the course image.

The rear projector driver 33 drives the light source and the liquid crystal panel of the rear projector unit 24 (see FIG. 3) disposed at the center of the rear of the vehicle body based on a signal from the drive assist controller 11. The rear projector driver 33 drives the rear projector unit 24 to project, onto the display area set in the rear windshield (see FIG. 4), a course image showing an arrow of a turning direction (right or left) and a distance to the turning point as illustrated in FIG. 5A or FIG. 5B.

The drive assist controller 11 causes the DMS 22 to detect a face orientation (or a line of sight) of the driver who operates the turn signal switch 28 behind an intersection to cause the vehicle M to turn at a predetermined position ahead. The drive assist controller 11 checks the face orientation of the driver against the traveling environment information on an area ahead of the vehicle M (forward traveling environment information) that is detected by the camera unit 21. Alternatively, a location on the road map that the driver causes the vehicle M to enter is found based on the face orientation (or the line-of-sight direction) of the driver with respect to a current position of the vehicle M that is detected by the navigation system 25.

When the driver is presumed to turn the vehicle M to enter a parking lot behind the intersection across a sidewalk on the side of the road, a moving target OB such as a pedestrian or a bicycle moving along the sidewalk, an oncoming vehicle F (when the vehicle M crosses an oncoming lane), and a succeeding vehicle S (when detected) are notified about information on the turn position of the vehicle M by projecting the image onto the road surface (see FIG. 10 or FIG. 11) and the image onto the rear windshield (see FIG. 5A or FIG. 5B).

Figure 7:
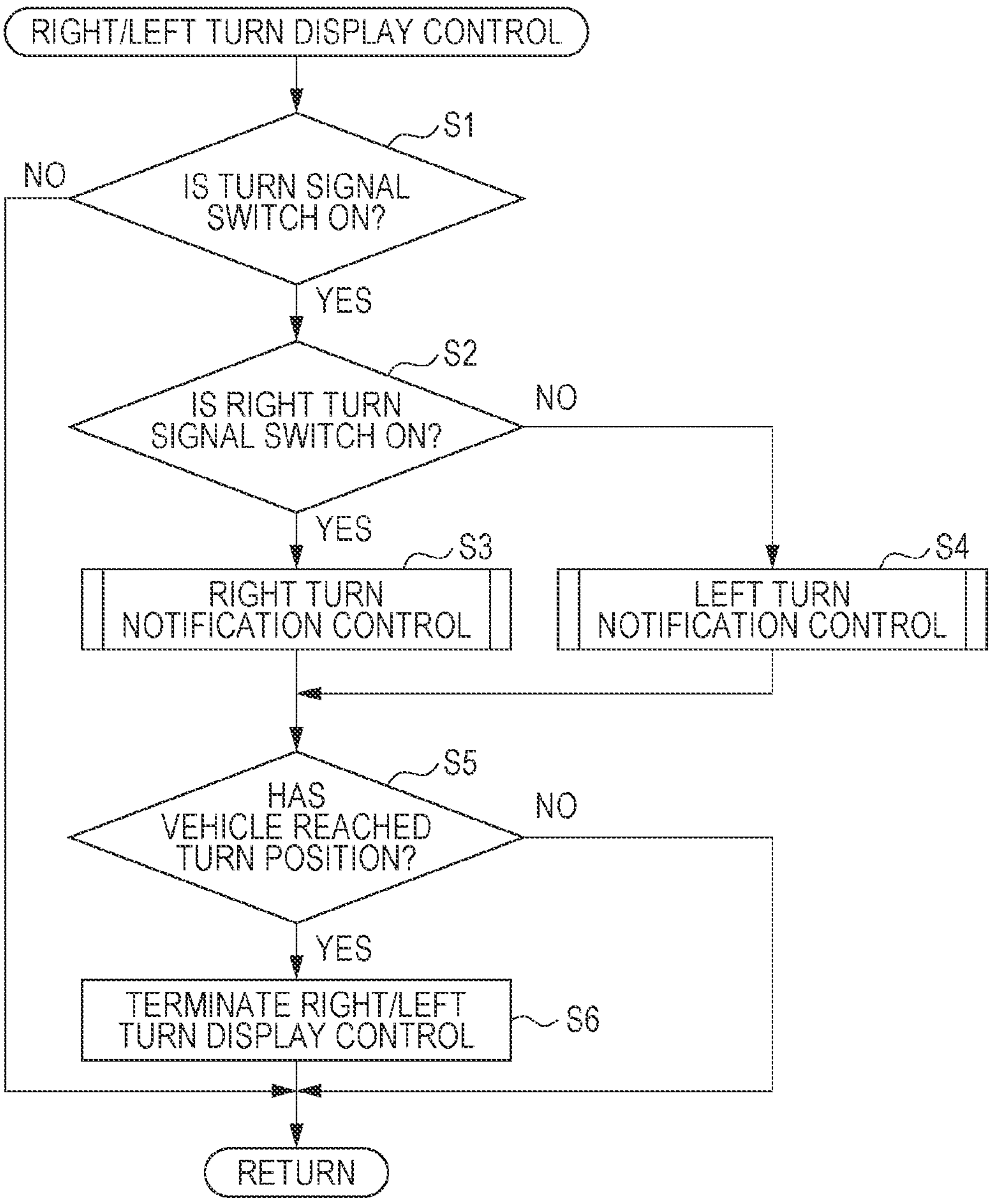
FIG. 7 is a flowchart illustrating a right/left turn display control routine.

The drive assist controller 11 notifies the moving target OB moving along the sidewalk, the succeeding vehicle S, and the oncoming vehicle F about the turn position by executing, for example, a right/left turn display control routine illustrated in FIG. 7.

In this routine, Step S1 is repeated until the driver turns ON the turn signal switch 28. When an operation of turning ON the turn signal switch 28 is detected, the process proceeds to Step S2. In Step S2, a check is made as to whether a right turn signal switch is turned ON. When the right turn signal switch is turned ON, the process proceeds to Step S3 to execute right turn notification control, and proceeds to Step S5. When a left turn signal switch is turned ON, the process branches to Step S4 to execute left turn notification control, and proceeds to Step S5. In one embodiment, the process of Steps S1 and S2 may serve as a process performed by a "turn signal operation detector" that detects the turn signal operation of the driver.

Right Turn Notification Control

Figure 8A:
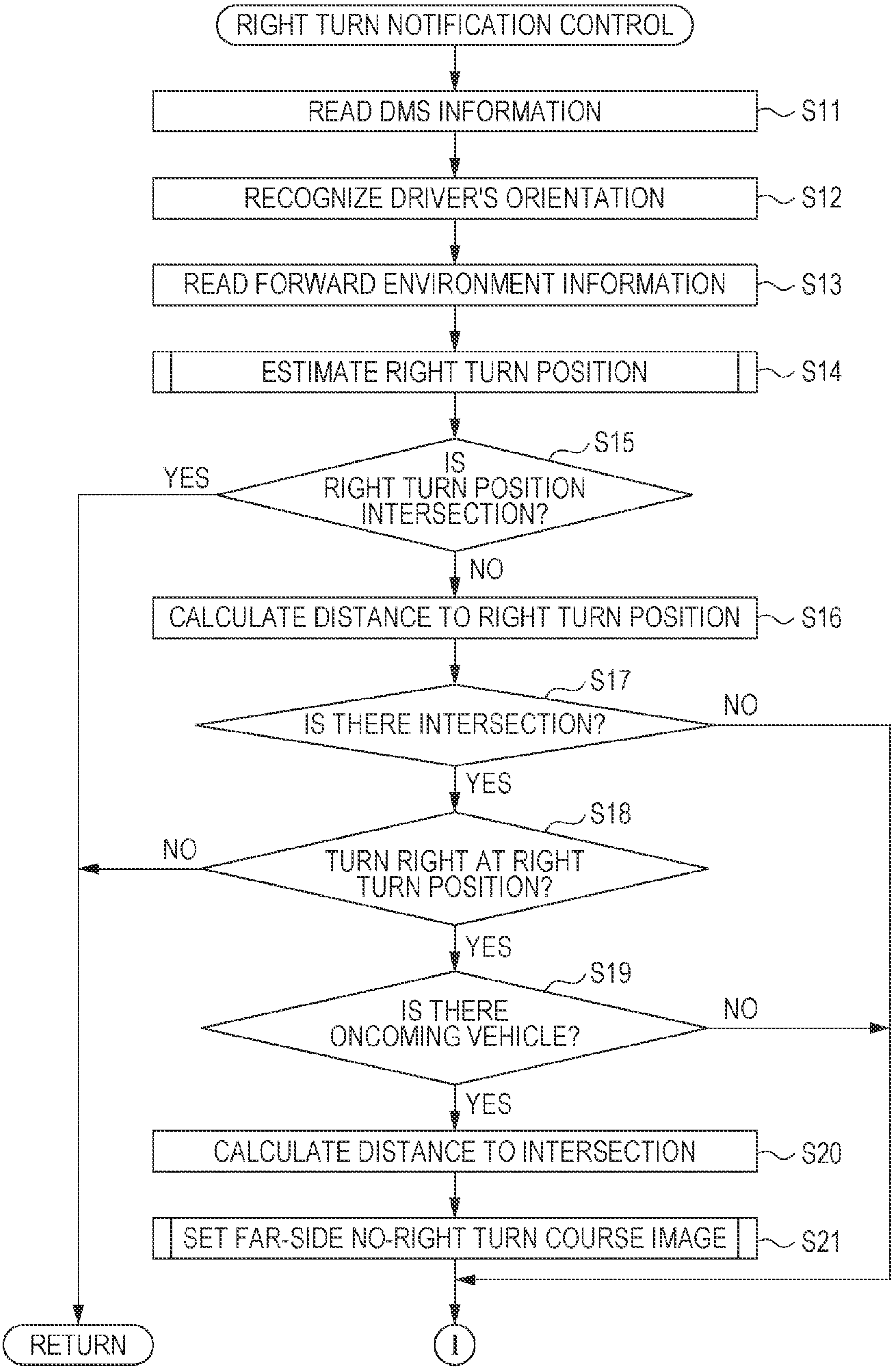
FIG. 8A is a flowchart illustrating a right turn notification control subroutine (Part 1)
Figure 8B:
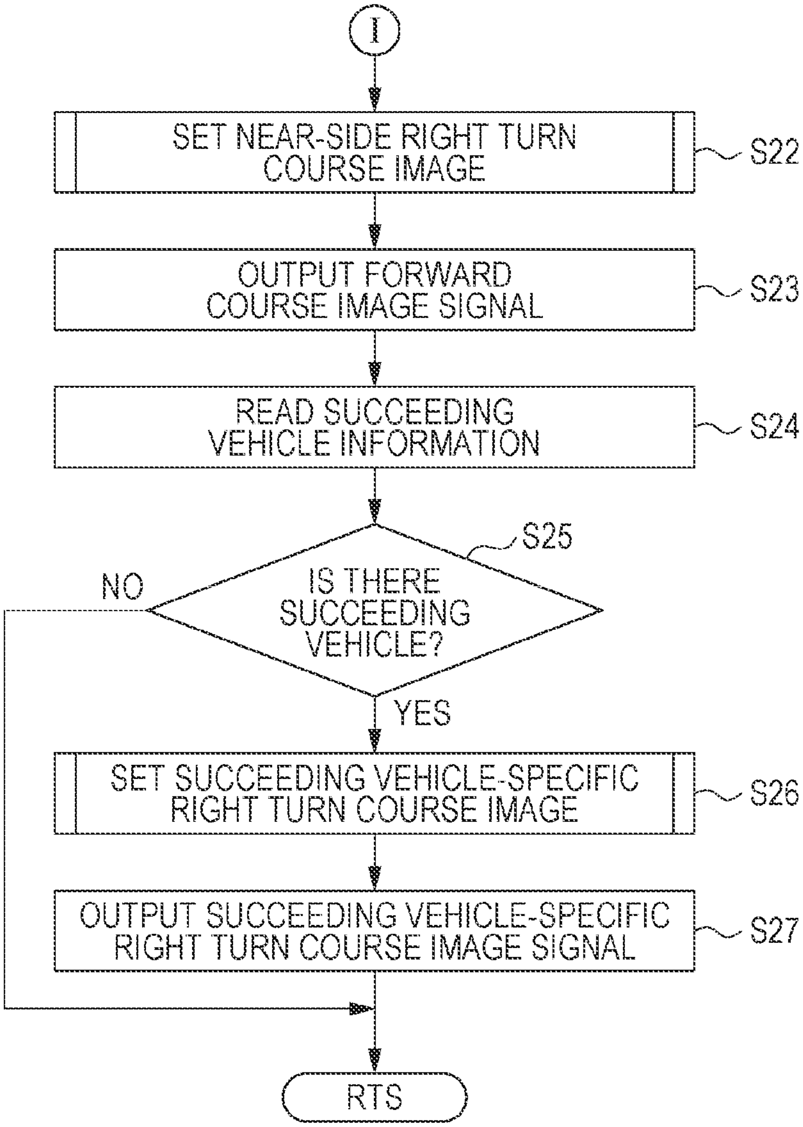
FIG. 8B is a flowchart illustrating the right turn notification control subroutine (Part 2)

The right turn notification control of Step S3 is executed in accordance with a right turn notification control subroutine illustrated in FIG. 8A and FIG. 8B. In Step S11 of this subroutine, driver's information detected by the DMS 22 (DMS information) is read. In Step S12, the face orientation of the driver is recognized from the DMS information. In Step S13, forward traveling environment information detected by the camera unit 21 is read.

In Step S14, the face orientation (or the line of sight) of the driver is checked against the forward traveling environment information to find a location that the driver causes the vehicle to enter by the right turn (entry location). Alternatively, the entry location is found by checking the face orientation (or the line-of-sight direction) of the driver against the road map information with respect to the current vehicle position detected by the navigation system 25. The position in a traveling lane facing the found entry location is estimated as a right turn position (see FIG. 10). In one embodiment, the process of Step S14 and Step S34 described later may serve as a process performed by a "turn position estimator".

When the face orientation (or the line of sight) of the driver is different from an orientation corresponding to the right turn direction, the drive assist controller 11 cannot find the entry location to which the driver will make the right turn. Therefore, the drive assist controller 11 has a system error and terminates the program of the right/left turn display control.

In Step S15, determination is made as to whether the position where the driver will make the right turn is an intersection or a position other than the intersection based on the right turn position in the forward traveling environment information or the road map information. Examples of the intersection include a T-intersection and a crossroad where the traveling lane of the vehicle M is coupled to another roadway. The position other than the intersection is a position on a roadway that faces the entrance of a parking lot of a shop or the like. In many cases, a sidewalk is provided between the roadway and the shop entrance (see FIG. 10 and FIG. 11). In one embodiment, the process of Step S15 and Step S17, Step S35, and Step S37 described later may serve as a process performed by an "intersection determiner".

When determination is made that the right turn position is the intersection, the process leaves the routine. When determination is made that the right turn position is a position other than the intersection, the process proceeds to Step S16. The right turn at the position other than the intersection may be, for example, the case of FIG. 10 where the vehicle enters the entrance (shop entrance) of the parking lot (shop parking lot) of the shop or the like across the sidewalk.

In Step S16, a distance Lp from the current position of the vehicle M to the right turn position set in Step S14 is calculated. In Step S17, a check is made as to whether an intersection is present on an oncoming lane side at a relatively near position (for example, within 10 m) ahead of the right turn position. Whether the intersection is present is checked based on the forward traveling environment information acquired by the camera unit 21 or the road map information acquired by the navigation system 25.

When the intersection is detected, the process proceeds to Step S18. When the intersection is not detected, determination is made that the vehicle M will turn right at the position other than the intersection, and the process jumps to Step S22.

In Step S18, the right turn position is the position other than the intersection, and the intersection is present ahead of that position. Therefore, the driver's intention as to whether to turn right at the right turn position is checked by using a loudspeaker of the navigation system 25. When determination is made to turn right at the right turn position, the process proceeds to Step S19. When determination is made to turn right at the intersection ahead of the right turn position, the process leaves the routine. In one embodiment, the process of Step S18 and Step S38 described later may serve as a process performed by an "intention checker".

Regarding the check on the driver's intention in Step S18, for example, the determination is "YES" when the driver nods his/her head based on head motion recognized by the DMS 22, and is "NO" when the driver shakes his/her head. Alternatively, "YES" or "NO" is determined by collecting the driver's voice by the loudspeaker and recognizing the collected voice. Alternatively, the right turn position is displayed on a monitor of the navigation system 25 and "YES" and "NO" touch switches are displayed to prompt the driver to touch either one. Since the driver's intention is checked when displaying the course image on the road surface, erroneous display can be suppressed.

In Step S19, a check is made as to whether an oncoming vehicle F traveling along the oncoming lane is recognized within a predetermined distance ahead of the intersection based on the forward traveling environment information acquired by the camera unit 21. When the oncoming vehicle F is recognized, the process proceeds to Step S20. When the oncoming vehicle F is not recognized, the process jumps to Step S22.

In Step S20, a distance Lk from the vehicle position to the intersection position is calculated based on the forward traveling environment information acquired by the camera unit 21 or the road map information acquired by the navigation system 25.

Figure 10:
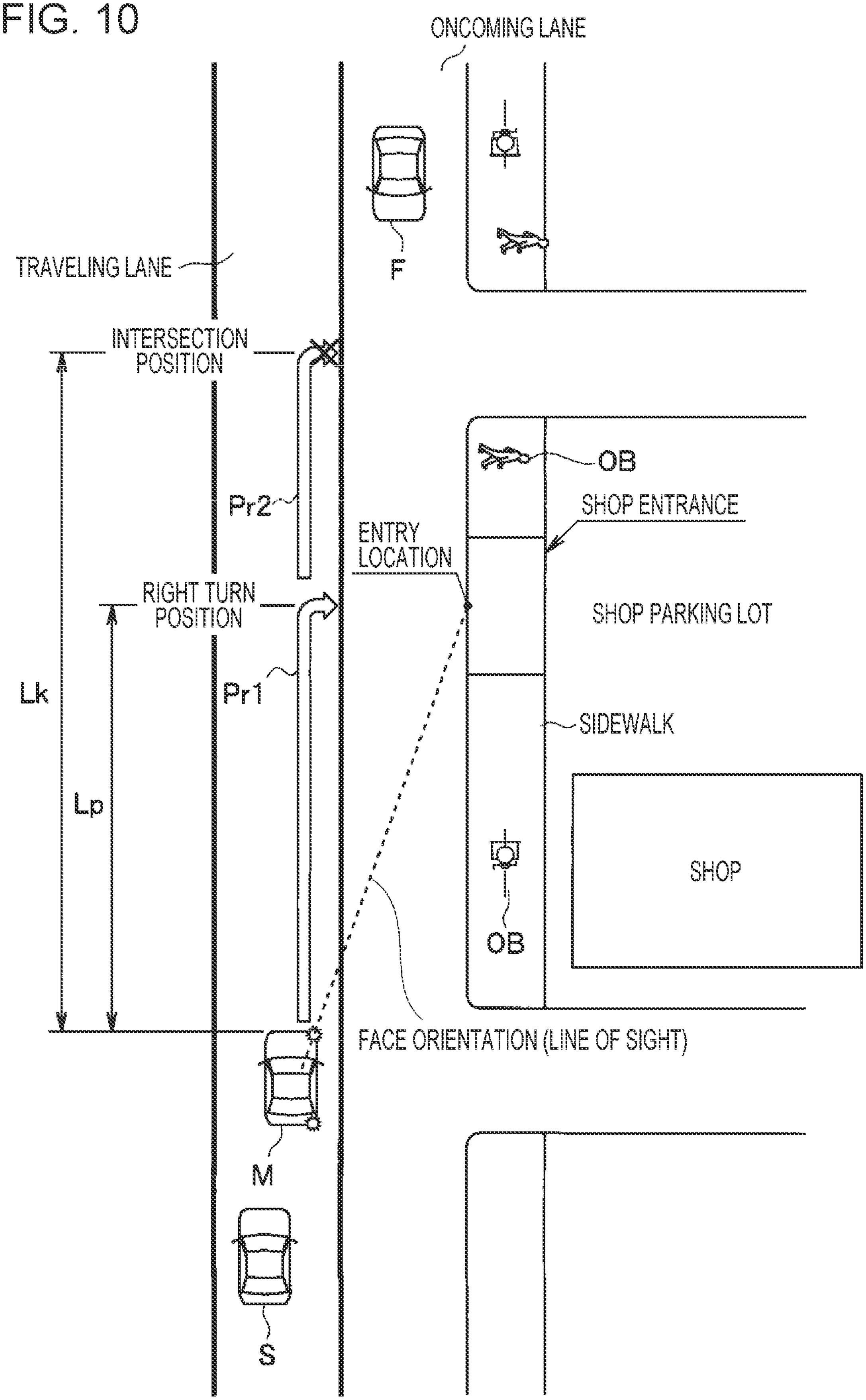
FIG. 10 is a bird's eye view illustrating notification for a right turn.

In Step S21, the drive assist controller 11 sets the far-side no-right turn course image Pr2 to be projected from the right projector unit 23*r* onto the road surface based on the distance Lk from the vehicle position to the intersection, and the process proceeds to Step S22. The far-side no-right turn course image Pr2 is used for notifying the oncoming vehicle F that the vehicle M will not turn right at the intersection but will turn right at the position behind the intersection. FIG. 2A and FIG. 10 illustrate the far-side no-right turn course image Pr2 projected onto the road surface. As illustrated in those figures, the projected far-side no-right turn course image Pr2 of this embodiment shows an arrow of the right turn direction and a no-right turn symbol "X" at the tip, thereby indicating that the vehicle will not turn right at the intersection ahead. In one embodiment, the process of Step S21 and Steps S22, S39, and S43 described later may serve as a process performed by a "course image setter".

When the process proceeds to Step S22 from Step S17, S19, or S21, the drive assist controller 11 sets the near-side right turn course image Pr1 to be projected from the right projector unit 23*r* onto the road surface, and the process proceeds to Step S23. FIG. 2A and FIG. 10 illustrate the near-side right turn course image Pr1 projected onto the road surface. This right turn course image shows an arrow of the right turn direction, and serves as a notification that the vehicle M will move in the arrow direction.

When the vehicle M turns right as illustrated in FIG. 10, the distance Lp from the vehicle M to the right turn position and the distance Lk from the vehicle M to the intersection position gradually decrease as the vehicle M travels. The near-side right turn course image Pr1 and the far-side no-right turn course image Pr2 are projected onto the road surface with their arrow positions fixed.

The length of the straight part of the near-side right turn course image Pr1 actually decreases. The liquid crystal panel of the right projector unit 23*r* that displays the near-side right turn course image Pr1 is controlled so that the arrow parts of the far-side no-right turn course image Pr2 and the near-side right turn course image Pr1 gradually approach the vehicle M as the vehicle M approaches the right turn position.

In Step S23, the drive assist controller 11 outputs, to the right projector driver 32*r*, an image signal of the far-side no-right turn course image Pr2 set in Step S21 and the near-side right turn course image Pr1 set in Step S22.

As illustrated in FIG. 2A, FIG. 3, and FIG. 10, the right projector driver 32*r* drives the right projector unit 23*r* to project the far-side no-right turn course image Pr2 and the near-side right turn course image Pr1 onto the road surface ahead of the vehicle M. Thus, the driver of the oncoming vehicle F and the moving target OB moving along the sidewalk (pedestrian or bicycle) can explicitly be notified that the vehicle M will enter the parking lot of the shop or the like behind the intersection. Since the oncoming vehicle F grasps the turn position of the vehicle M, attention can be paid to the behavior of the vehicle M while decelerating behind the turn position. Since the moving target OB can predict that the vehicle M will enter the entrance of the shop or the like, the moving target OB can avoid carelessly moving into the shop entrance.

In a case of a color liquid crystal panel, the color arrangement of the image to be projected from the right projector unit 23*r* onto the road surface can be set freely. For example, the far-side no-right turn course image Pr2 may have an achromatic color of high lightness, and the near-side right turn course image Pr1 may have a chromatic color of high lightness, thereby facilitating the distinction therebetween.

In Step S24, succeeding vehicle information (for example, information as to whether a succeeding vehicle S is present and a distance and a relative speed between the vehicle M and the succeeding vehicle S) detected by the succeeding vehicle detector 26*b* of the rear detection unit 26 is read, and the process proceeds to Step S25.

In Step S25, a check is made as to whether a succeeding vehicle S following the vehicle M is detected based on the succeeding vehicle information. When the succeeding vehicle S is not detected, the process leaves the routine and proceeds to Step S5 of FIG. 7. When the succeeding vehicle S is detected, the process proceeds to Step S26.

In Step S26, the drive assist controller 11 sets a succeeding vehicle-specific right turn course image Pre. In one embodiment, the succeeding vehicle-specific right turn course image Pre may be referred to as a "succeeding vehicle-specific course image". The succeeding vehicle-specific right turn course image Pre is projected from the rear projector unit 24 onto the rear display area Ad (see FIG. 4) in the rear windshield. FIG. 5A illustrates the succeeding vehicle-specific right turn course image Pre projected onto the rear display area Ad. The succeeding vehicle-specific right turn course image Pre illustrated in FIG. 5A includes a right turn arrow blinking in conjunction with the turn signal switch 28 operated by the driver, and the distance Lp from the vehicle M to the right turn position. The distance Lp is displayed stepwise. For example, the distance Lp is displayed at intervals of 5 m in a range from 30 m to 10 m, and is displayed at intervals of 1 m in a range from 10 m.

In Step S27, the drive assist controller 11 outputs, to the rear projector driver 33, an image signal of the succeeding vehicle-specific right turn course image Pre set in Step S26. Then, the process leaves the routine and proceeds to Step S5 of FIG. 7.

The rear projector driver 33 drives the rear projector unit 24 to project the succeeding vehicle-specific right turn course image Pre onto the rear display area Ad set in the rear windshield illustrated in FIG. 4. The succeeding vehicle-specific right turn course image Pre is illustrated in FIG. 5A and has already been described. Therefore, its description is omitted.

When the succeeding vehicle S is detected during the right turn, the succeeding vehicle-specific right turn course image Pre is projected onto the rear display area Ad in the rear windshield. Thus, the driver of the succeeding vehicle S can visually and explicitly be notified about the timing when the preceding vehicle (vehicle M) will turn right. As the preceding vehicle (vehicle M) approaches the right turn position, the driver of the succeeding vehicle S decelerates in conjunction with the preceding vehicle (vehicle M) or changes lanes, thereby avoiding collision. In a case of a color liquid crystal panel, the color arrangement of the image to be projected from the rear projector unit 24 onto the rear display area Ad can be set freely. Therefore, the succeeding vehicle-specific right turn course image Pre is not limited to the display content in FIG. 5A.

Left Turn Notification Control

Figure 9A:
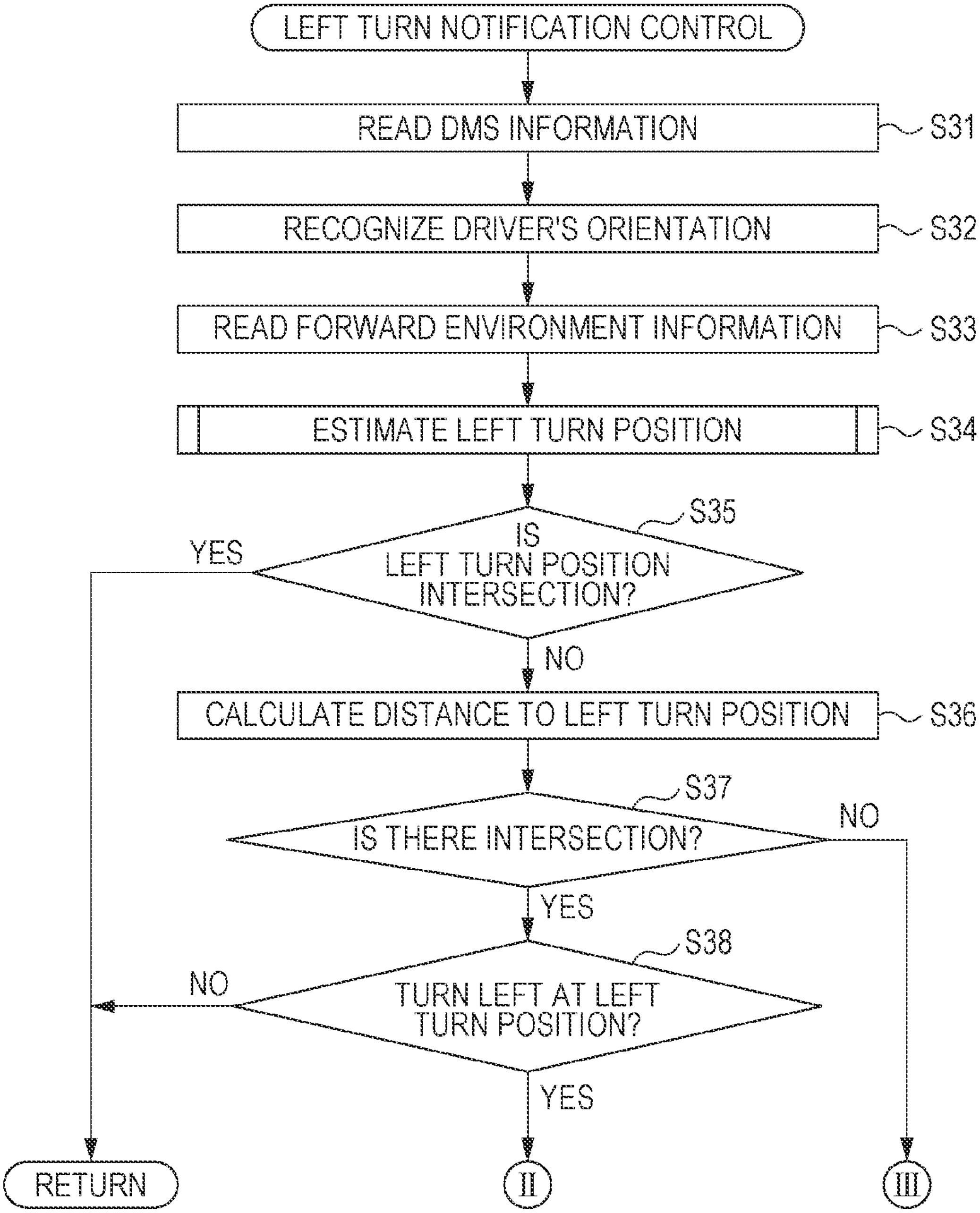
FIG. 9A is a flowchart illustrating a left turn notification control subroutine (Part 1)
Figure 9B:
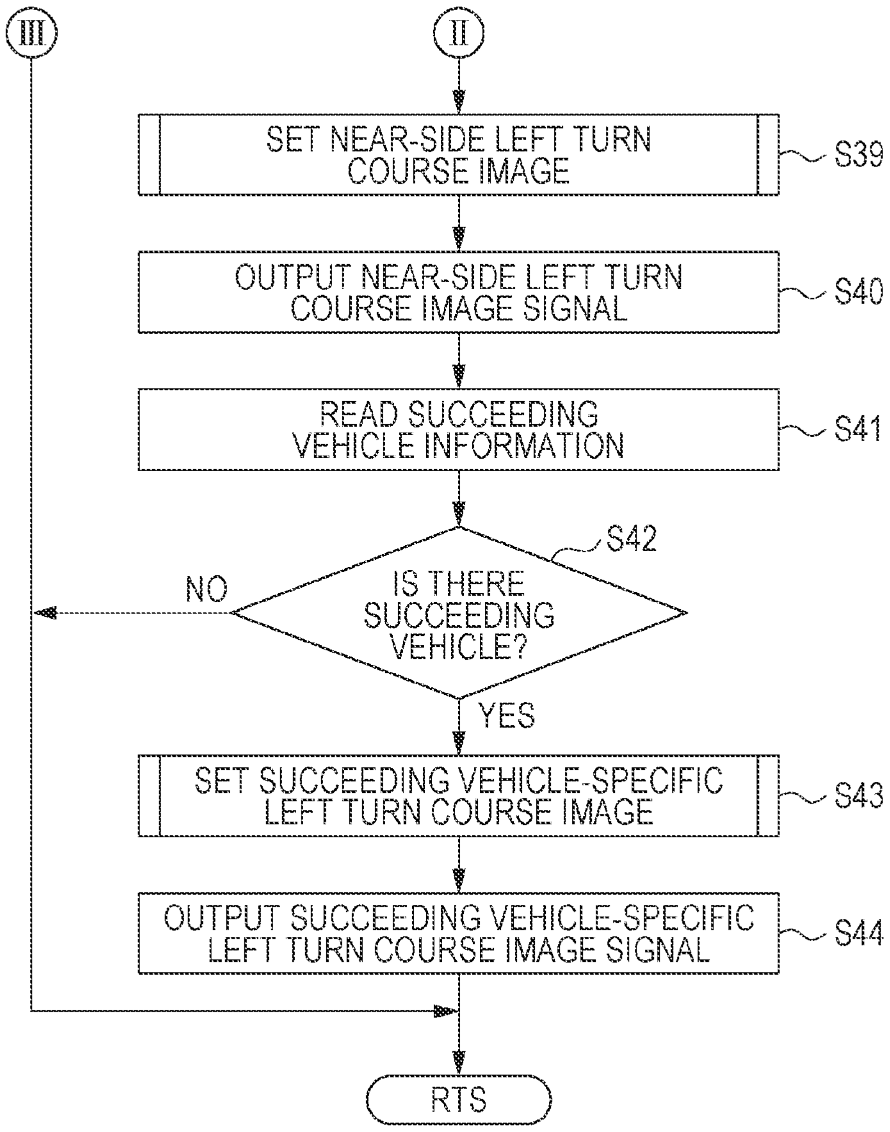
FIG. 9B is a flowchart illustrating the left turn notification control subroutine (Part 2)

The left turn notification control to be executed in Step S4 of FIG. 7 is processed in accordance with a left turn notification control subroutine illustrated in FIG. 9A and FIG. 9B.

In this subroutine, the same process as that of Steps S11 to S13 of FIG. 8A is executed in Steps S31 to S33.

In Step S34, the face orientation (or the line of sight) of the driver is checked against the forward traveling environment information to find a location that the driver causes the vehicle to enter by the left turn (entry location). Alternatively, the entry location is found by checking the face orientation (or the line-of-sight direction) of the driver against the road map information with respect to the current vehicle position detected by the navigation system 25. The position in a traveling lane facing the entry location is estimated as a left turn position (see FIG. 11). When the face orientation (or the line of sight) of the driver is different from an orientation corresponding to the left turn direction, the drive assist controller 11 cannot find the entry location. Therefore, the drive assist controller 11 has a system error and terminates the program of the right/left turn display control.

In Step S35, determination is made as to whether the position where the driver will make the left turn is an intersection based on the left turn position in the forward traveling environment information or the road map information. When determination is made that the left turn position is the intersection, the process leaves the routine. When determination is made that the left turn position is a position other than the intersection, the process proceeds to Step S36. The left turn at the position other than the intersection may be, for example, the case of FIG. 11 where the vehicle enters the entrance (shop entrance) of the parking lot (shop parking lot) of the shop or the like across the sidewalk.

In Step S36, a distance Lp from the current position of the vehicle M to the left turn position set in Step S34 is calculated, and the process proceeds to Step S37. In Step S37, a check is made as to whether an intersection is present on the left turn side at a relatively near position (for example, within 10 m) ahead of the left turn position. When the intersection is detected, the process proceeds to Step S38. When the intersection is not detected, the process leaves the routine and proceeds to Step S5 of FIG. 7.

In Step S38, the left turn position is the position other than the intersection. Therefore, the driver's intention as to whether to turn left at the left turn position is checked by using the loudspeaker of the navigation system 25. When determination is made to turn left at the left turn position, the process proceeds to Step S39. When determination is made to turn left at the intersection ahead of the left turn position, the process leaves the routine. The check on the driver's intention in this case has already been described. Therefore, its description is omitted. Since the driver's intention is checked when displaying the course image on the road surface, erroneous display can be suppressed.

Figure 11:
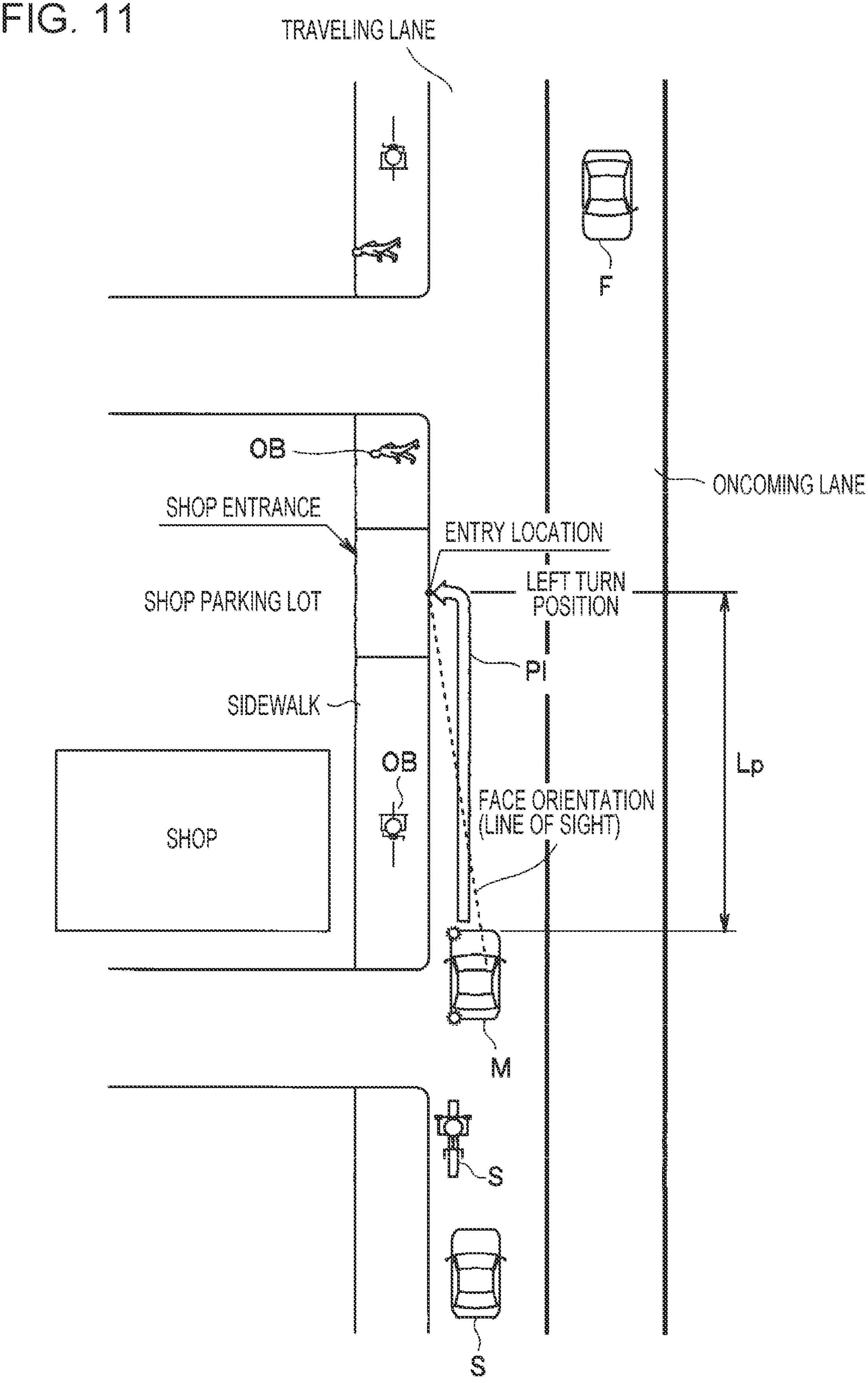
FIG. 11 is a bird's eye view illustrating notification for a left turn.

In Step S39, the drive assist controller 11 sets the near-side left turn course image Pl to be projected from the left projector unit 23*l* onto the road surface, and the process proceeds to Step S40. FIG. 2B and FIG. 11 illustrate the near-side left turn course image Pl projected onto the road surface. In those figures, an arrow represents the course in the left turn direction, and a notification is given for the fact that the vehicle M will move in the arrow direction.

When the vehicle M turns left as illustrated in FIG. 11, the distance Lp from the vehicle M to the left turn position gradually decreases as the vehicle M travels. The left turn course image is projected onto the road surface with its arrow position fixed. The length of the straight part of the near-side left turn course image Pl gradually decreases. The liquid crystal panel of the left projector unit 23*l* is controlled so that the arrow part of the near-side left turn course image Pl gradually approaches the vehicle M as the vehicle M approaches the left turn position.

In Step S40, the drive assist controller 11 outputs, to the left projector driver 321, an image signal of the near-side left turn course image Pl set in Step S39.

As illustrated in FIG. 2B and FIG. 11, the left projector driver 32*l* drives the left projector unit 23*l* to project the near-side left turn course image Pl onto the road surface ahead of the vehicle M. Thus, the moving target OB moving along the sidewalk (pedestrian or bicycle) can explicitly be notified that the vehicle M will enter the parking lot of the shop or the like behind the intersection. Since the moving target OB can predict that the vehicle M will enter the entrance of the shop or the like, the moving target OB can avoid carelessly moving into the shop entrance. In a case where the left projector unit 23*l* includes a color liquid crystal panel, the color arrangement of the image to be displayed on the road surface can be set freely.

In Step S41, succeeding vehicle information detected by the succeeding vehicle detector 26*b* of the rear detection unit 26 is read. In Step S42, a check is made as to whether a succeeding vehicle S following the vehicle M is detected based on the read succeeding vehicle information.

When the succeeding vehicle S is not detected, the process leaves the routine and proceeds to Step S5 of FIG. 7. When the succeeding vehicle S is detected, the process proceeds to Step S43. As illustrated in FIG. 11, the succeeding vehicle S is not limited to an automobile, and includes a vehicle traveling in the traveling lane, such as a motorcycle.

In Step S43, the drive assist controller 11 sets a succeeding vehicle-specific left turn course image Ple to be projected onto the rear display area Ad (see FIG. 4) in the rear windshield by driving the rear projector unit 24. FIG. 5B illustrates the succeeding vehicle-specific left turn course image Ple projected onto the rear display area Ad. In one embodiment, the succeeding vehicle-specific left turn course image Ple may be referred to as a "succeeding vehicle-specific course image". The succeeding vehicle-specific left turn course image Ple illustrated in FIG. 5B includes a left turn arrow blinking in conjunction with the turn signal switch 28 operated by the driver, and the distance Lp from the vehicle M to the left turn position. The display example of the distance Lp has already been described, and therefore its description is omitted.

In Step S44, the drive assist controller 11 outputs, to the rear projector driver 33, an image signal of the succeeding vehicle-specific left turn course image Ple set in Step S43. Then, the process leaves the routine and proceeds to Step S5 of FIG. 7.

The rear projector driver 33 drives the rear projector unit 24 to project the succeeding vehicle-specific left turn course image Ple onto the rear display area Ad set in the rear windshield illustrated in FIG. 4. The succeeding vehicle-specific left turn course image Ple is illustrated in FIG. 5B.

When the succeeding vehicle S is detected during the left turn, the succeeding vehicle-specific left turn course image Ple is projected onto the rear display area Ad in the rear windshield. Thus, the driver of the succeeding vehicle S can visually and explicitly be notified about the timing when the preceding vehicle (vehicle M) will turn left. As the preceding vehicle (vehicle M) approaches the left turn position, the driver of the succeeding vehicle S decelerates in conjunction with the preceding vehicle (vehicle M) or changes lanes, thereby avoiding collision. In a case where the succeeding vehicle S is a motorcycle or a bicycle, the vehicle M can avoid side collision with the motorcycle or the bicycle during the left turn. In a case of a color liquid crystal panel, the color arrangement of the image to be projected from the rear projector unit 24 onto the rear display area Ad can be set freely. Therefore, the succeeding vehicle-specific left turn course image Ple is not limited to the display content in FIG. 5B.

When the process proceeds to Step S5 from Step S3 or S4 of FIG. 7, the drive assist controller 11 checks whether the vehicle M has reached the turn position (right turn position or left turn position). When the vehicle M has not reached the turn position, the process leaves the routine. When the vehicle M has reached the turn position, the process proceeds to Step S6. Whether the vehicle M has reached the turn position is checked based on the distance Lp. When the distance Lp is zero or a value close to zero (about 0.5 m to 1 m), determination is made that the vehicle M has reached the turn position.

In Step S6, the right/left turn display control is terminated and the process leaves the routine. The right/left turn display control is terminated by outputting an OFF signal to the operating driver out of the right projector driver 32*r*, the left projector driver 32*l*, and the rear projector driver 33.

In this embodiment, when the vehicle M makes a turn (to the right or left) to enter the shop parking lot or the like behind the intersection, the course image indicating the turn position is projected onto the road surface ahead of the vehicle M. In the case of the right turn, the oncoming vehicle F can explicitly be notified about the right turn position. When making the turn, the moving target OB moving along the sidewalk can also be notified that the vehicle M will enter the shop parking lot or the like. Thus, the moving target OB can avoid careless movement.

When the vehicle M makes the turn behind the intersection, a check is made as to whether the succeeding vehicle S is present. When the succeeding vehicle S is detected, the information indicating the turn is projected onto the rear display area Ad set in the rear windshield to notify the succeeding vehicle S about the turn timing. Therefore, rear-end collision can be suppressed. In the case where the succeeding vehicle S is a motorcycle or a bicycle, the vehicle M can avoid side collision with the motorcycle or the bicycle during the left turn.

The embodiment of the disclosure is not limited to the embodiment described above. For example, a single projector unit may be provided at the center of the front of the vehicle M in the vehicle width direction to perform the operations of both the right and left projector units 23*r* and 23*l*. Further, projector units may be disposed on the sides of the vehicle M to project a notification image indicating that the vehicle M will enter a turn-side sidewalk across which the vehicle M will enter a shop parking lot or the like behind an intersection.

According to the embodiment of the disclosure, when the driver operates the turn signal, the position where the driver causes the vehicle to make a turn is estimated based on the face orientation or the line of sight of the driver. When determination is made that the estimated position is not an intersection, the course image indicating the turn position of the vehicle is set and projected from the projector onto a road surface ahead. Thus, when entering a parking lot of a shop or the like, an oncoming vehicle or any other surrounding moving target can explicitly be notified about the course of the vehicle.

The drive assist controller 11 illustrated in FIG. 6 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive assist controller 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 6.

The invention claimed is:

1. A vehicle drive assist apparatus to be applied to a vehicle, the vehicle drive assist apparatus comprising:
- a traveling environment information acquirer comprising at least one of a camera or a sensor, the traveling environment information acquirer configured to acquire traveling environment information on an area around the vehicle;
- an orientation detector comprising a camera, the orientation detector configured to detect a face orientation or a line of sight of a driver who drives the vehicle; and
- a controller configured to:
  - project a course image, on a road surface ahead of the vehicle, indicating a turning direction of the vehicle to notify a moving target surrounding the vehicle of the turning direction of the vehicle, the moving target comprising at least one of an oncoming vehicle or a target moving along a sidewalk, wherein
  - when detecting a turn signal operation by the driver, estimate a turn position of the vehicle using the detected face orientation or a direction of the detected line of sight of the driver, the turn position being a position in a traveling lane of the vehicle and facing an entry location that the driver causes the vehicle to enter by right turn or left turn,
  - determine whether the turn position is a position on a roadway facing an entrance to a parking space, and
  - when detecting that the turn position is the position on the roadway other than an intersection ahead of the vehicle in the traveling lane of the vehicle, calculate a distance from the vehicle to the turn position based on the acquired traveling environment information, and project on the road surface the course image indicating the calculated distance from the vehicle to the turn position and the turning direction of the vehicle.

2. The vehicle drive assist apparatus according to claim 1, the controller is further configured to:
- check whether the driver intends to turn the vehicle at the estimated turn position, and
- in response to determining that the driver intends to turn the vehicle at the estimated turn position, set the course image.

3. The vehicle drive assist apparatus according to claim 2, wherein the controller is further configured to, in response to the turn signal operation for a direction in which the vehicle crosses an oncoming lane being detected and the intersection ahead of the turn position being detected, set a no-turn image at the intersection.

4. The vehicle drive assist apparatus according to claim 2, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

5. The vehicle drive assist apparatus according to claim 3, wherein the controller is further configured to, in response to an oncoming vehicle being detected in the oncoming lane based on the acquired traveling environment information, display the no-turn image.

6. The vehicle drive assist apparatus according to claim 3, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

7. The vehicle drive assist apparatus according to claim 5, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

8. The vehicle drive assist apparatus according to claim 5, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

9. The vehicle drive assist apparatus according to claim 1, wherein the controller is further configured to, in response to the turn signal operation for a direction in which the vehicle crosses an oncoming lane being detected and the intersection ahead of the turn position being detected, set a no-turn image at the intersection.

10. The vehicle drive assist apparatus according to claim 9, wherein the controller is further configured to, in response to an oncoming vehicle being detected in the oncoming lane based on the acquired traveling environment information, display the no-turn image.

11. The vehicle drive assist apparatus according to claim 9, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

12. The vehicle drive assist apparatus according to claim 1, the controller is further configured to:
- detect a succeeding vehicle following the vehicle; and
- in response to the succeeding vehicle being detected, set a succeeding vehicle-specific course image indicating the turn position and to be projected by a rear projector provided at a rear of the vehicle.

13. The vehicle drive assist apparatus according to claim 1, wherein the controller is configured to project the calculated distance indicated in the course image gradually decrease as the vehicle travels.

14. A vehicle drive assist apparatus to be applied to a vehicle, the vehicle drive assist apparatus comprising circuitry configured to acquire traveling environment information on an area around the vehicle, detect a face orientation or a line of sight of a driver who drives the vehicle, cause a projector to project a course image, on a road surface ahead of the vehicle, indicating a turning direction of the vehicle to notify a moving target surrounding the vehicle of the turning direction of the vehicle, the moving target comprising at least one of an oncoming vehicle or a target moving along a sidewalk, wherein when detecting a turn signal operation by the driver, estimate a turn position of the vehicle using the detected face orientation or a direction of the detected line of sight of the driver, the turn position being a position in a traveling lane of the vehicle and facing an entry location that the driver causes the vehicle to enter by right turn or left turn, determine whether the turn position is a position on a roadway facing an entrance to a parking space, and when detecting that the turn position is the position on the roadway other than an intersection ahead of the vehicle in the traveling lane of the vehicle, calculate a distance from the vehicle to the turn position based on the acquired traveling environment information, and project on the road surface the course image indicating the calculated distance from the vehicle to the turn position and the turning direction of the vehicle.

15. The vehicle drive assist apparatus according to claim 14, wherein the circuitry is further configured to, in response to the turn signal operation being detected for a direction in which the vehicle crosses an oncoming lane and the intersection being detected ahead of the turn position, set a no-turn image at the intersection.

16. The vehicle drive assist apparatus according to claim 15, wherein the circuitry is configured to, in response to an oncoming vehicle being detected in the oncoming lane based on the acquired traveling environment information, display the no-turn image.

17. The vehicle drive assist apparatus according to claim 14, wherein the circuitry is configured to:

detect a succeeding vehicle following the vehicle; and in response to the succeeding vehicle being detected, set a succeeding vehicle-specific course image indicating the turn position and to be projected by a rear projector provided at a rear of the vehicle.

18. The vehicle drive assist apparatus according to claim 14, wherein the circuitry is configured to project the calculated distance indicated in the course image gradually decrease as the vehicle travels.

* * * * *